(12) United States Patent
Ozsoylu et al.

(10) Patent No.: US 6,488,115 B1
(45) Date of Patent: Dec. 3, 2002

(54) APPARATUS AND METHOD FOR STEERING A VEHICLE

(75) Inventors: Suat Ali Ozsoylu, Saginaw, MI (US);
William F Feriend, Freeland, MI (US);
Michael R. Pyrett, Flint, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/920,181

(22) Filed: Aug. 1, 2001

(51) Int. Cl.[7] .............................. B62D 5/04; B62D 5/00; B62D 5/06
(52) U.S. Cl. ........................................ 180/444; 180/402
(58) Field of Search ........................... 180/402, 403–405

(56) References Cited

U.S. PATENT DOCUMENTS

| | | |
|---|---|---|
| 637,204 A | 11/1899 | Heath |
| 1,234,779 A | 7/1917 | Ljungberg |
| 1,284,827 A | 11/1918 | Vorraber |
| 1,321,417 A | 11/1919 | Carlborg et al. |
| 4,223,254 A | 9/1980 | Adams |
| 4,651,840 A | 3/1987 | Shimizu et al. |
| 4,664,211 A | 5/1987 | Oshita et al. ............... 180/142 |
| 4,681,182 A | 7/1987 | Suzuki et al. |
| 4,686,433 A | 8/1987 | Shimizu |
| 4,719,396 A | 1/1988 | Shimizu |
| 4,730,686 A | 3/1988 | Shimizu |
| 4,751,978 A | 6/1988 | Drutchas et al. |
| 4,754,829 A | 7/1988 | Shimizu |
| 4,765,426 A | 8/1988 | Shimizu |
| 4,771,845 A | 9/1988 | Shimizu |
| 4,785,901 A | 11/1988 | Maeda ........................ 180/142 |
| 4,819,170 A | 4/1989 | Shimizu |
| 4,825,972 A | 5/1989 | Shimizu |
| 4,837,692 A | 6/1989 | Shimizu |
| 5,247,441 A | 9/1993 | Serizawa et al. |
| 5,251,135 A | 10/1993 | Serizawa et al. |
| 5,347,458 A | 9/1994 | Serizawa et al. |
| 5,732,791 A | 3/1998 | Pinkos et al. |
| 5,991,675 A | 11/1999 | Asanuma ..................... 701/41 |
| 6,006,854 A | 12/1999 | Nakajima .................... 180/446 |
| 6,041,885 A | 3/2000 | Watanabe et al. |
| 6,298,941 B1 | 10/2001 | Spadafora .................... 180/422 |
| 6,389,924 B1 * | 5/2002 | Ryne et al. .................. 180/444 |

* cited by examiner

Primary Examiner—Kevin Hurley
Assistant Examiner—Matthew Luby
(74) Attorney, Agent, or Firm—Edmund P. Anderson

(57) ABSTRACT

A steering system for a vehicle, the steering system includes a rack-independent actuator. The rack-independent actuator has component parts isolates from undesirable loads by two universal joints that isolate mechanical components of the actuator from transient loads that may be encountered by the rack or rack housing.

26 Claims, 16 Drawing Sheets

APPARATUS AND METHOD FOR STEERING A VEHICLE

CROSS REFERENCE TO RELATED APPLICATIONS

This application is related to U.S. patent application, Ser. No. 09/664,850, filed Sep. 19, 2000, the contents of which are incorporated herein by reference thereto.

This application is also related to U.S. patent application, Ser. No. 09/650,869, filed Aug. 30, 2000, the contents of which are incorporated herein by reference thereto.

This application is also related to U.S. patent application, Ser. No. 09/663,549, filed Sep. 18, 2000, the contents of which are incorporated herein by reference thereto.

TECHNICAL FIELD

This invention relates generally to an apparatus and method for steering a vehicle, and more specifically to a rack-independent actuator.

BACKGROUND

Many current steering system designs have replaced the hydraulic power steering pump with electrically assisted systems based on fuel economy, modularity, engine independence, and environmental issues.

With electrically actuated or electrically assisted steering systems there is a significant servo mechanism design challenge associated with the need to maintain proper kinematical constraint, while at the same time, providing reasonable insulation from the drawbacks of tolerance stack up which may produce system lock up.

Although a successful servo mechanism design may appear to be a combination of basic "catalogue" mechanisms (e.g. ball-screw, gears, belts, various joints, etc.), the way these are used in combination represents an unmistakably cardinal feature of this art.

The current state of engineering meets these concerns by anticipating the stresses likely to be encountered by designing heavy-duty components. Needless to say, these designs are expensive to manufacture, have excessive performance challenges because of the increased inertia and friction, and add to the overall weight of the vehicle.

SUMMARY OF THE INVENTION

The system is powered by a rotary type electric motor. The motor has speed reducers and rotary-to-linear actuators to achieve feasible size and linear actuation. The actuation unit is decoupled from the directionally unwanted loads by providing universal joints (or an equivalent degree of freedoms) at either end. One universal joint is mounted to the housing that holds the motor rotary-to-rotary speed reducer and the movable shaft of the linear-to-rotary actuator, and the other is mounted to a member that is linearly moved by the linear-to-rotary actuator.

The use of universal joints (or gimbals), which provides kinematical degrees of freedom to prevent non-axial loads, also prevents bending moments on the rotary-to-linear actuator. In particular, such loads may result from the misalignment of the shafts and/or non-axial loading from other components. This situation may produce undesirable friction and high stresses resulting in loss of efficiency and/or undesirable steering feel. By avoiding the non-axial loads, the mechanization becomes feasible for all types of linear-to-rotary mechanizations, which today are limited to very special ball-screws.

DESCRIPTION OF THE PREFERRED EMBODIMENT

The independent actuator system of an exemplary embodiment of the present invention employs the judicious use of universal joints, (gimbal) expansion joints, or other equivalents to achieve freedom from lock-up as well as compensation for reasonable tolerance stack-up errors, which must be designed around current steering system designs.

A benefit of the Electric Power Steering and Steer-by-Wire system is the enhanced comfort to the driver of a vehicle equipped with this system. The driver of such a vehicle would experience improved handling over less-than-smooth terrains e.g., potholes, graded surfaces, etc.

Less-than-smooth terrain increases the loads and deflections encountered by the steering system. Thus, any bumps experienced by the vehicle may increase the wear and tear to the steering system, thus shortening and reducing its effective life.

Figure 1:
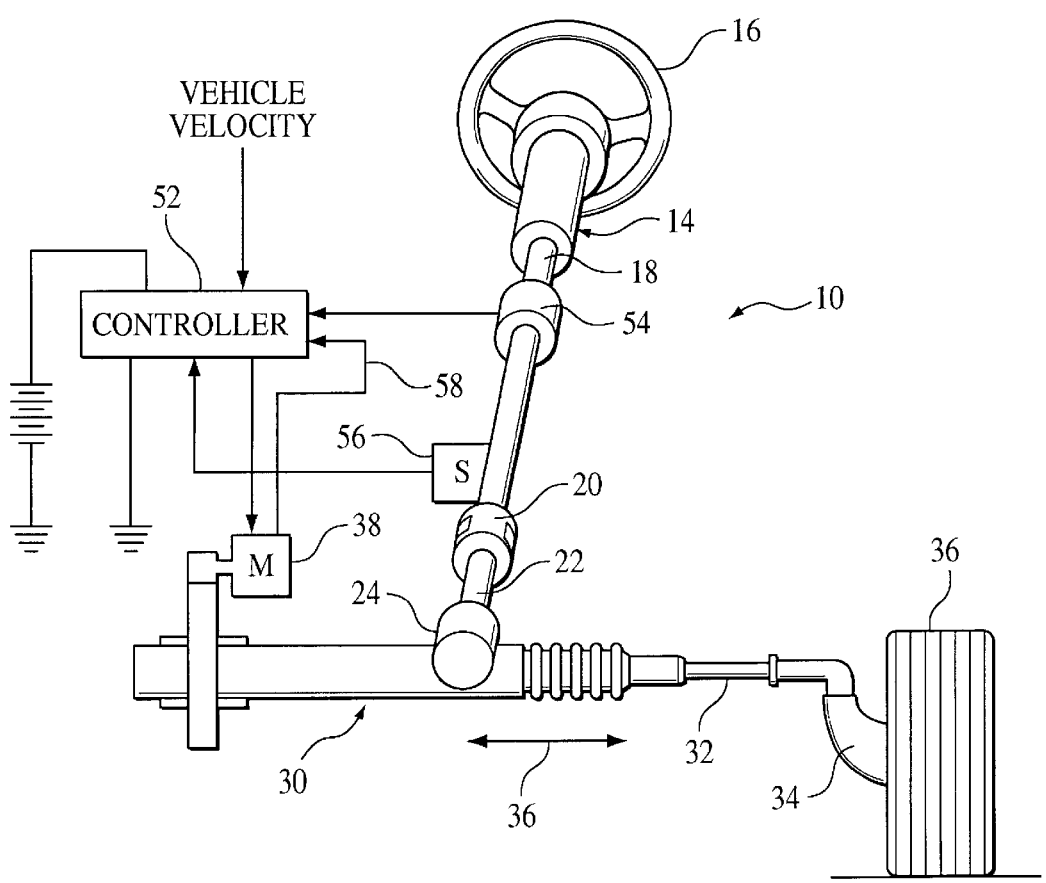
FIG. 1 is an illustration of a steering system for a vehicle.
Figure 2:
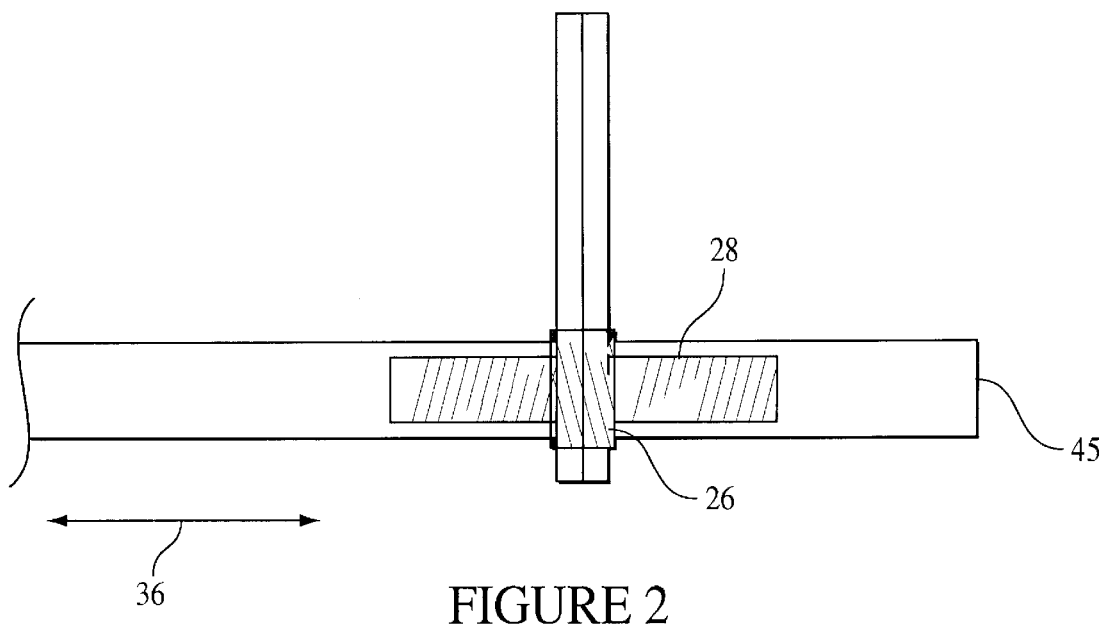
FIG. 2 is an illustration of a portion of the steering system in FIG. 1.
Figure 3:
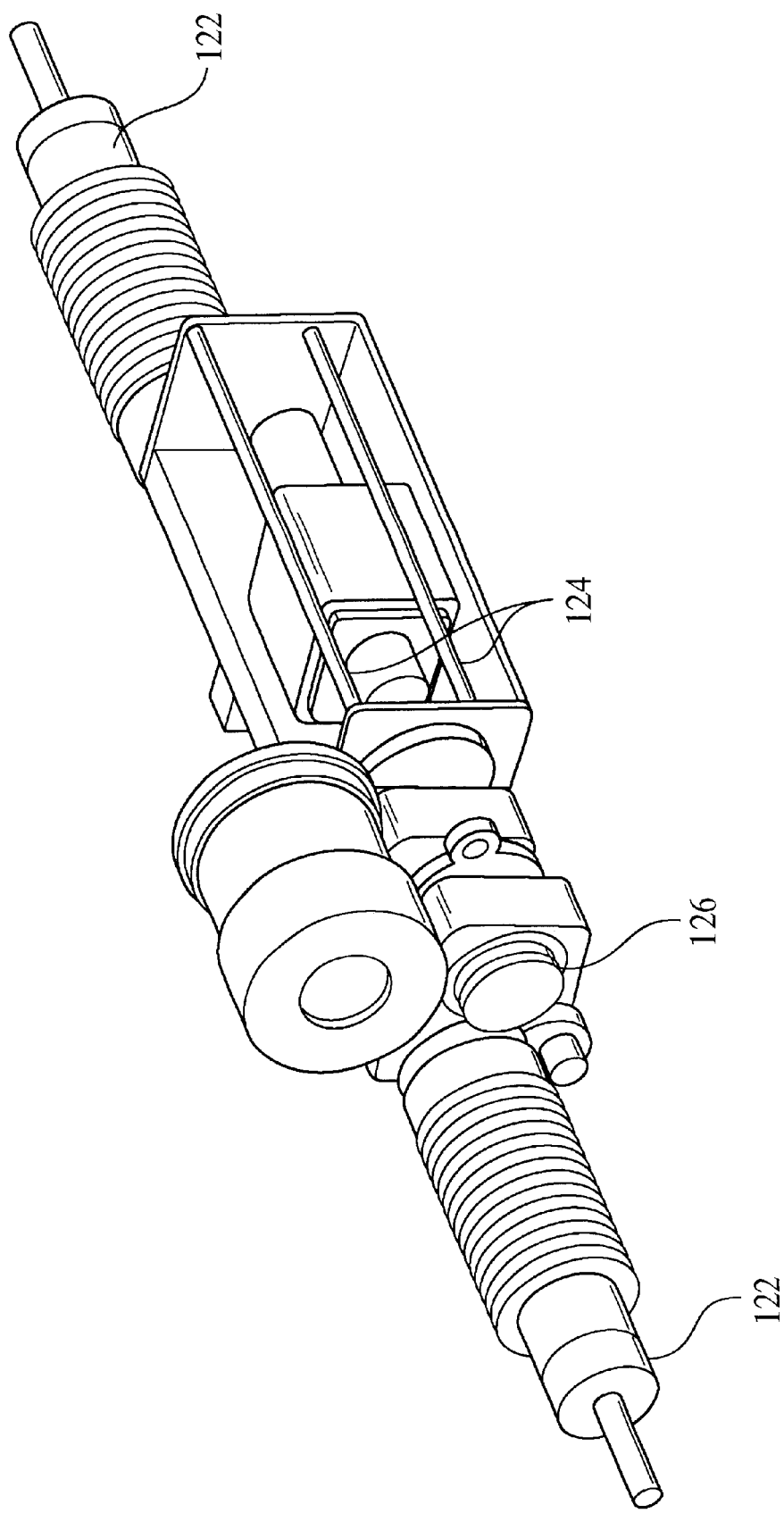
FIG. 3 is a perspective view of a rack-independent actuator constructed in accordance with an exemplary embodiment of the present invention.

Referring now to FIGS. 1 and 2, a steering system 10 for use in a vehicle 12 (not shown) is illustrated. Steering system 10 allows the operator of vehicle 12 to control the direction of vehicle 12 through the manipulation of steering system 10.

A steering column 14 provides mechanical manipulation of the vehicle's wheels in order to control the direction of the vehicle. Steering column 14 includes a hand wheel 16. Hand wheel 16 is positioned so that a user can apply a rotational force to steering column 14. An upper steering column shaft 18 is secured to hand wheel 16 at one end and column universal joint 20 at the other. Column universal joint 20 couples upper steering column shaft 18 to a lower steering column shaft 22. Lower steering column shaft 22 is secured to column universal joint 20 at one end and a gear housing 24 at the other. Gear housing 24 includes a pinion gear 26 (FIG. 2). Pinion gear 26 of gear housing 24 is positioned to make contact with a matching toothed portion 28 of a rack assembly 30. Pinion gear 26 has helical teeth that are meshingly engaged with straight-cut teeth of matching toothed portion 28.

The pinion gear, in combination with the straight-cut gear teeth of the rack, form a rack and pinion gear set. The rack 45 is coupled to the vehicle's steerable wheels with steering linkage in a known manner.

Tie rods (only one shown) 32 are secured to rack assembly 30 at one end and knuckles 34 (only one shown) at the other.

As a rotational force is applied to steering column 14, through the manipulation of hand wheel 16 or other applied force, the pinion gear of gear housing 24 is accordingly rotated. The movement of the pinion gear causes the movement of rack assembly 30 in the direction of arrows 36, which in turn manipulates tie rods 32 and knuckles 34 in order to reposition wheels 36 (only one shown) of the motor vehicle. Accordingly, when the steering wheel 16 is turned, rack 45 and pinion gear 26 convert the rotary motion of the steering wheel 16 into the linear motion of rack 45.

In order to assist the user-applied force to the steering system, an electric motor 38 is energized to provide power assist to the movement of rack 45, aiding in the steering of the vehicle by the vehicle operator.

Electric motor 38 provides a torque force to a motor pulley 40 via motor shaft 42. The rotation force of motor pulley 40 is transferred to a belt 44. There are retaining walls 41 on either one of the pulleys 40 and/or ball-screw pulley 62 to help prevent belt 44 from slipping completely off. Alternatively, motor pulley 40 can be configured to have no retaining walls. In yet another alternative, belt 44 is replaced by a chain or gear system or any rotary to rotary drives that provides a rotational force to the screw 64 of the ball-screw mechanism.

Accordingly, and as a torque force is applied to the belt 44, the rotational force is converted into a linear force via the rotary-to-linear actuator (ball-screw assembly 66), and rack 45 is moved in one of the directions of arrows 36. Of course, the direction of movement of rack assembly 30 corresponds to the rotational direction of motor pulley 40. Belt 44 has an outer surface 46 and an inner engagement surface 48. The configuration belt 44 and the position of electric motor 38 allows inner engagement surface 48 of belt 44 to wrap around and engage both the motor pulley 40 and ball-screw pulley 62, that are fixed to the rotary portion of a ball-screw 66 (rotary to linear actuator) mechanism.

Electric motor 38 is actuated by a controller 52 that receives inputs from a torque sensor 54 and a rotational position sensor 56. Sensor 56 provides a steer angle signal to controller 52.

In addition, and as the motor shaft 42 of electric motor 38 turns, the motor shaft position signals of each phase are generated within electric motor 38 and are inputted in to controller 52 through a bus 5 8.

Controller 52 also receives an input in the form of a vehicle speed signal. Accordingly, and in response to the following inputs: vehicle velocity input; operator torque input (sensor 54); steering pinion gear angle (sensor 56); and motor shaft 42 position signals (bus 58), controller 52 determines the desired electric motor's current phases and provides such currents through a bus 60.

Motor pulley 40 is rotated by motor shaft 42 of electric motor 38. A second pulley 62 is fixedly secured to the ball-screw 64 screw (or the rotary part of a rotary to linear actuator) of a ball-screw assembly 66. The ball-screw assembly 66 converts the rotary force of belt 44 into the linear movement of a ball nut 68.

Motor pulley 40 and ball-screw pulley 62 may be constructed out of a lightweight material such as aluminum or composites . This allows the overall mass and inertia of steering system to be reduced in order to improve manufacturing costs and performance, as well as vehicle fuel efficiency.

FIGS. 1 and 2 illustrate a power assist steering system which includes a mechanical connection between (rack and pinion) hand wheel 16 and rack assembly 30.

Alternatively, and in applications in which a "steer-by-wire system" is employed, there is no direct mechanical connection between hand wheel 16 and rack assembly 30. In this application, the driver's rotational movement of the hand wheel 16 (and /or signal from an equivalent driver control device such as a joystick, pedal(s) and other mechanism for manipulation by the vehicle operator) is input into the controller 52 while electric motor 38 provides the necessary force to manipulate rack assembly 30.

Referring now to FIGS. 3–14, a rack-independent actuator 70 is illustrated. In accordance with an exemplary embodiment, rack-independent actuator 70 provides the necessary force to effect the linear movement of a rack 45 coupled to the steerable wheels of a vehicle. Rack-independent actuator 70 performs the functions of rotating the steerable wheels of a vehicle in response to an input such as driver manipulation of a steering wheel. In addition, and while performing this function the rack independent actuator 70 isolates its reduction mechanisms and/or conversion mechanisms necessary to effect the rotation of the steerable wheels from transient and non-axial (to the rack) loads by a pair of universal joints 72 and 74.

Figure 16:
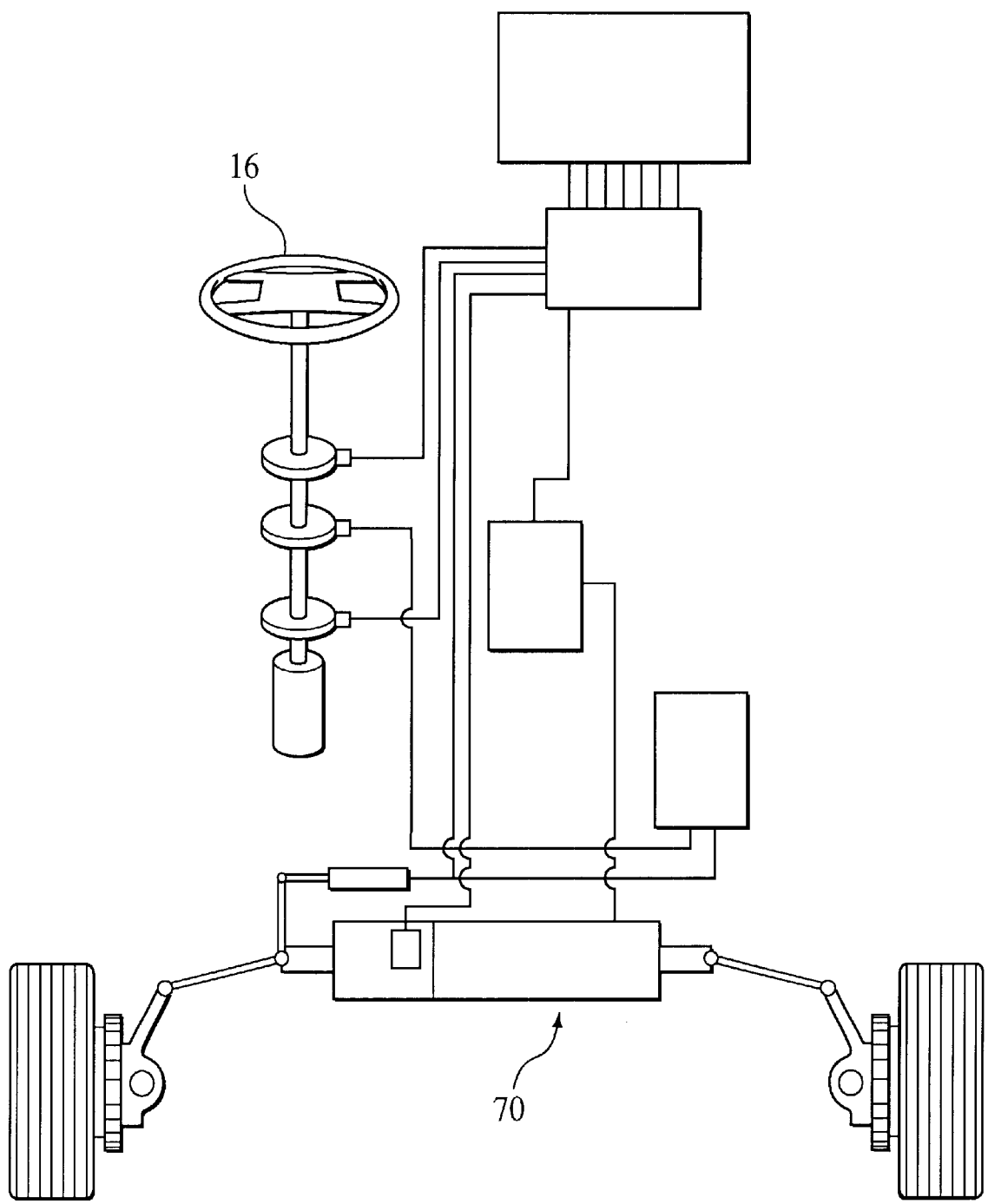
FIG. 16 a diagrammatic view of a steer by wire system.
Figure 17:
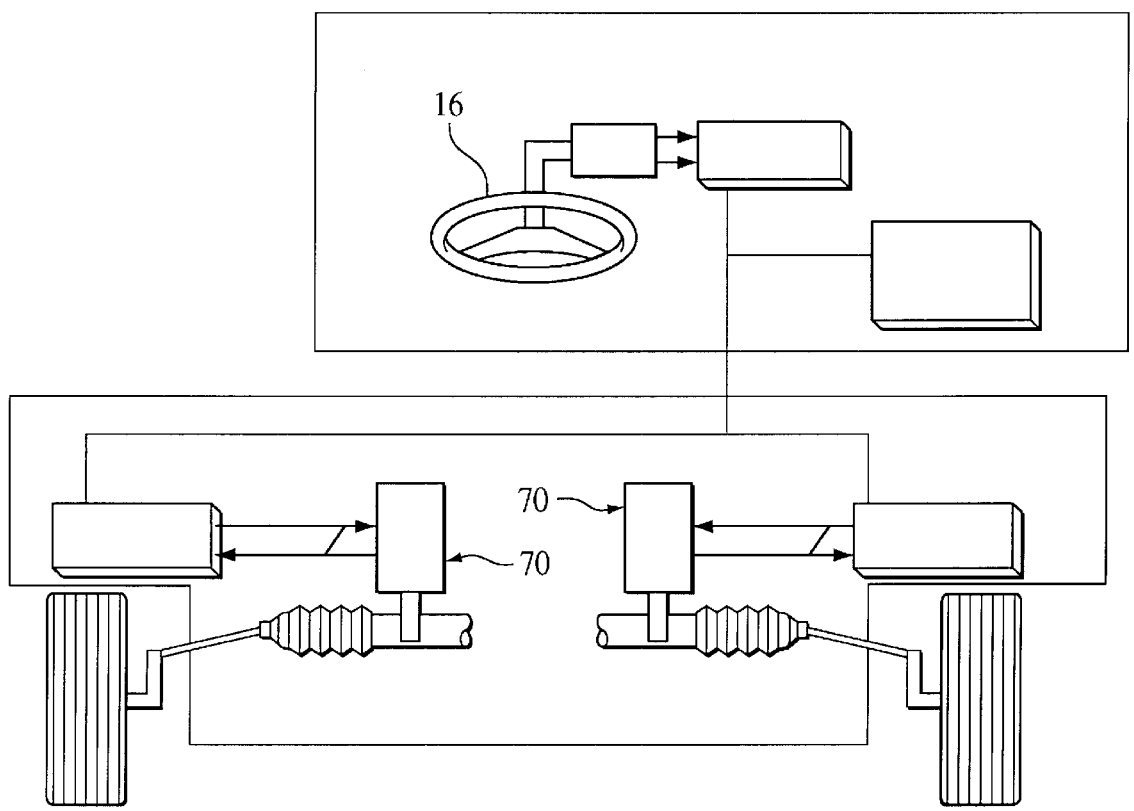
FIG. 17 is a diagrammatic view of a steer by wire system with independent actuators for each steerable wheel of a vehicle.

Rack-independent actuator 70 is also contemplated for use with a power assist steering system (FIGS. 1 and 2) and/or a "steer-by-wire system" (FIGS. 16 and 17) and/or rear wheel steering and/or four-wheel steering.

Figure 8:
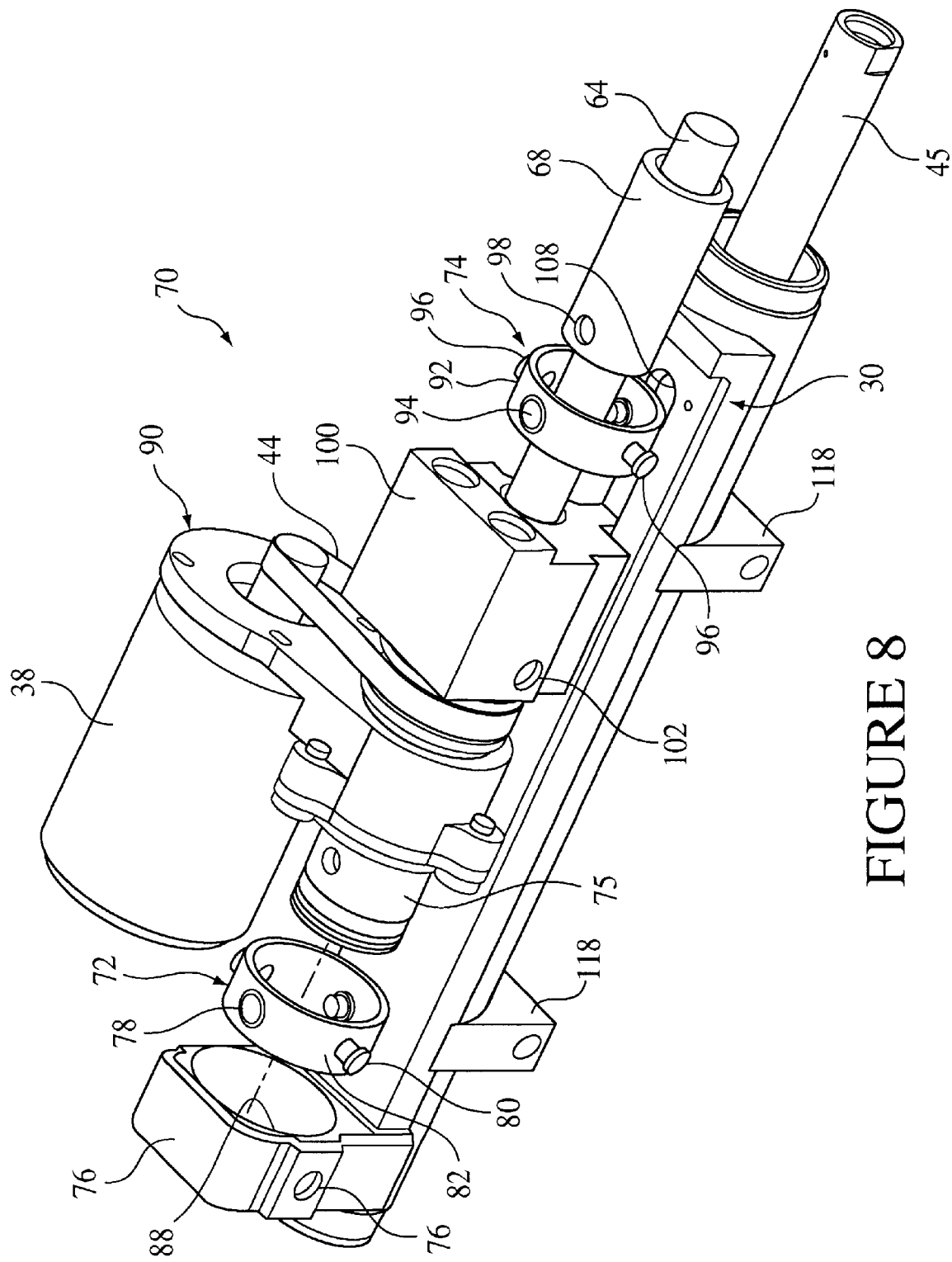
FIGS. 8 and 9 are perspective views of a rack-independent actuator illustrating the universal joints in an exploded view.
Figure 9:
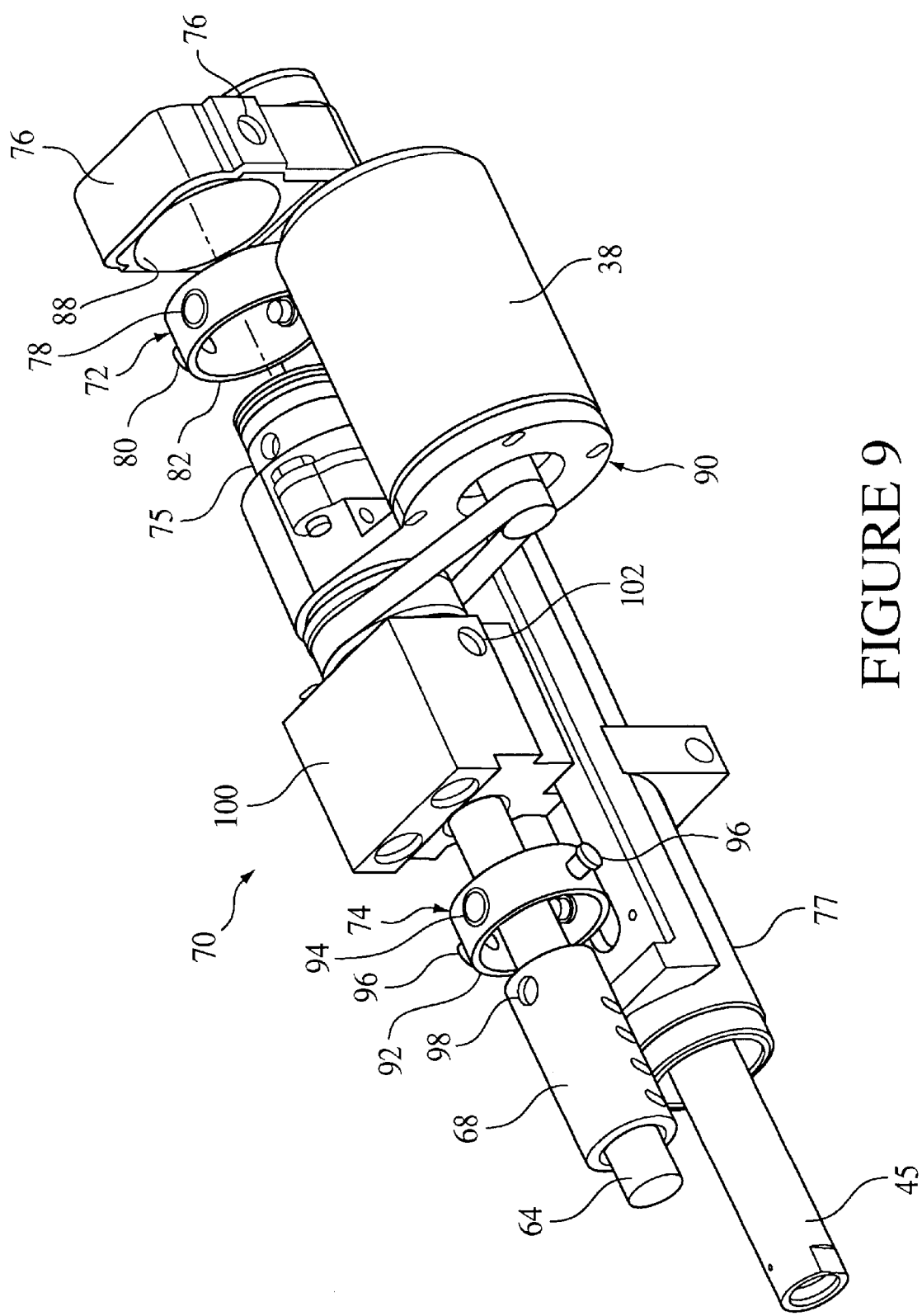
Figure 10:
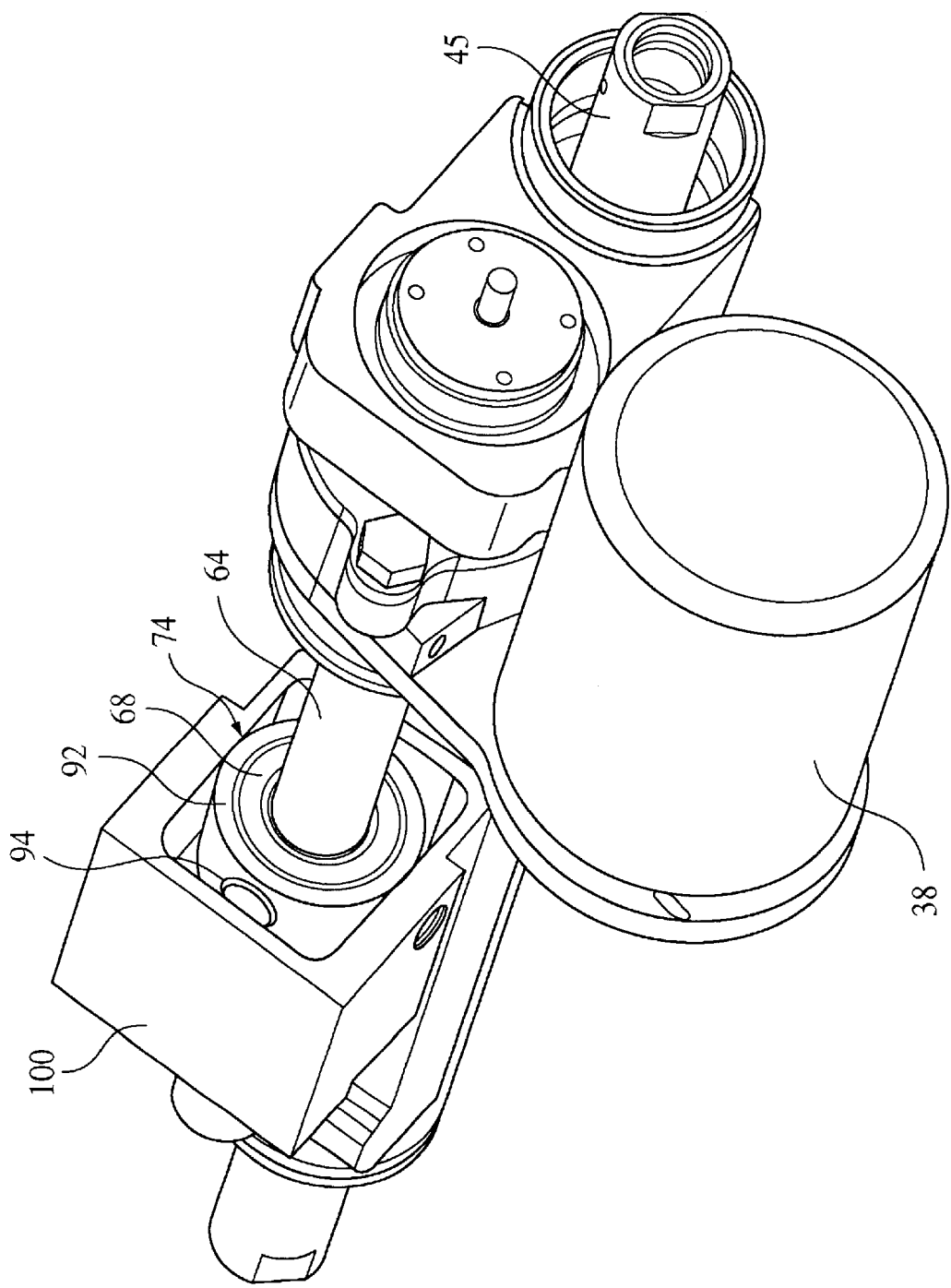
FIG. 10 is an end perspective view of the rack-independent constructed in accordance with an exemplary embodiment of the present invention.
Figure 11:
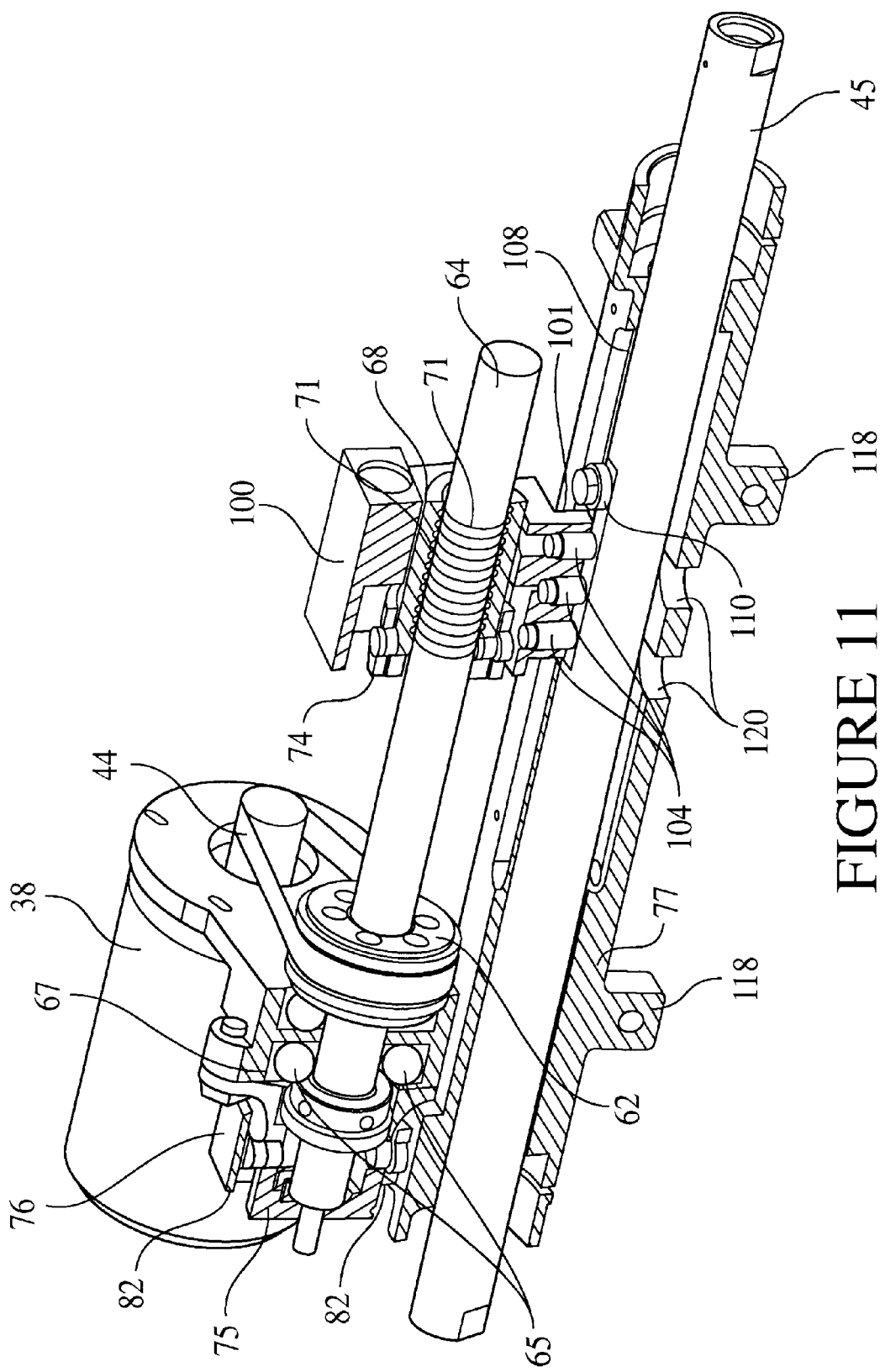
FIG. 11 is a partial cross sectional perspective view of a rack-independent actuator constructed in accordance with an exemplary embodiment of the present invention.
Figure 12:
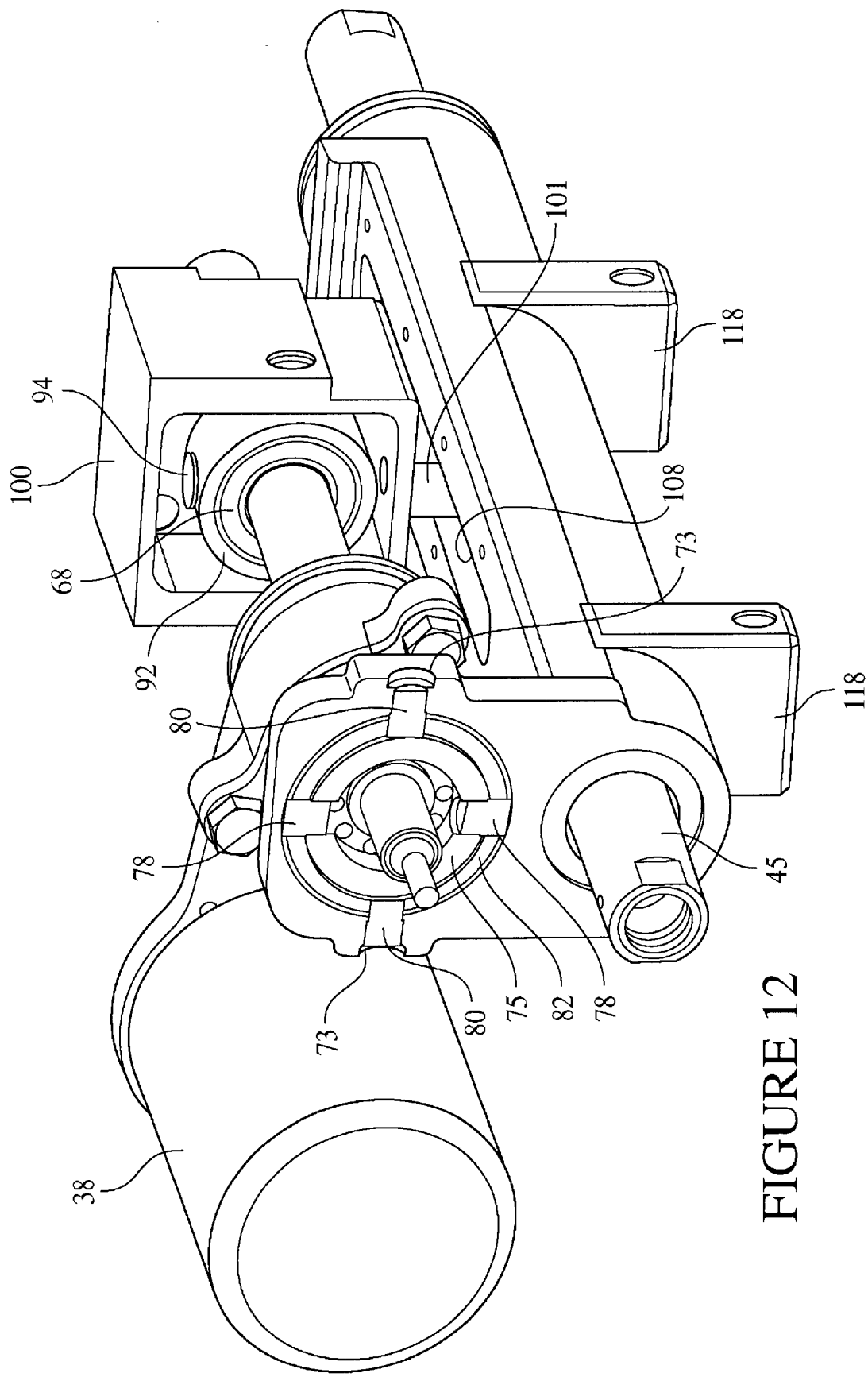
FIG. 12 is a partial cross sectional perspective view of a universal joint of a rack-independent actuator constructed in accordance with an exemplary embodiment of the present invention.
Figure 13:
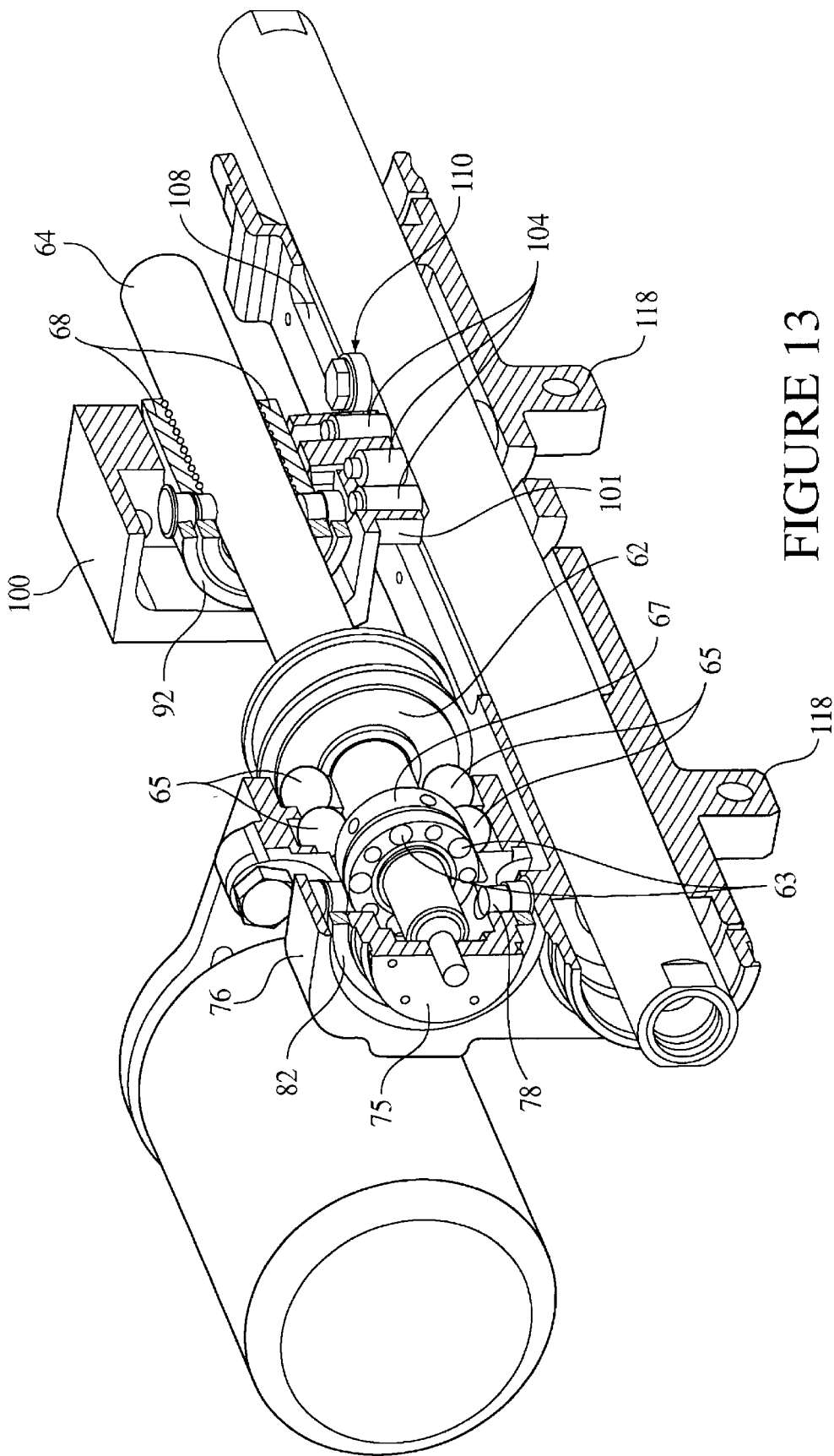
FIG. 13 is a partial cross sectional perspective view of a rack-independent actuator constructed in accordance with an exemplary embodiment of the present invention.
Figure 14:
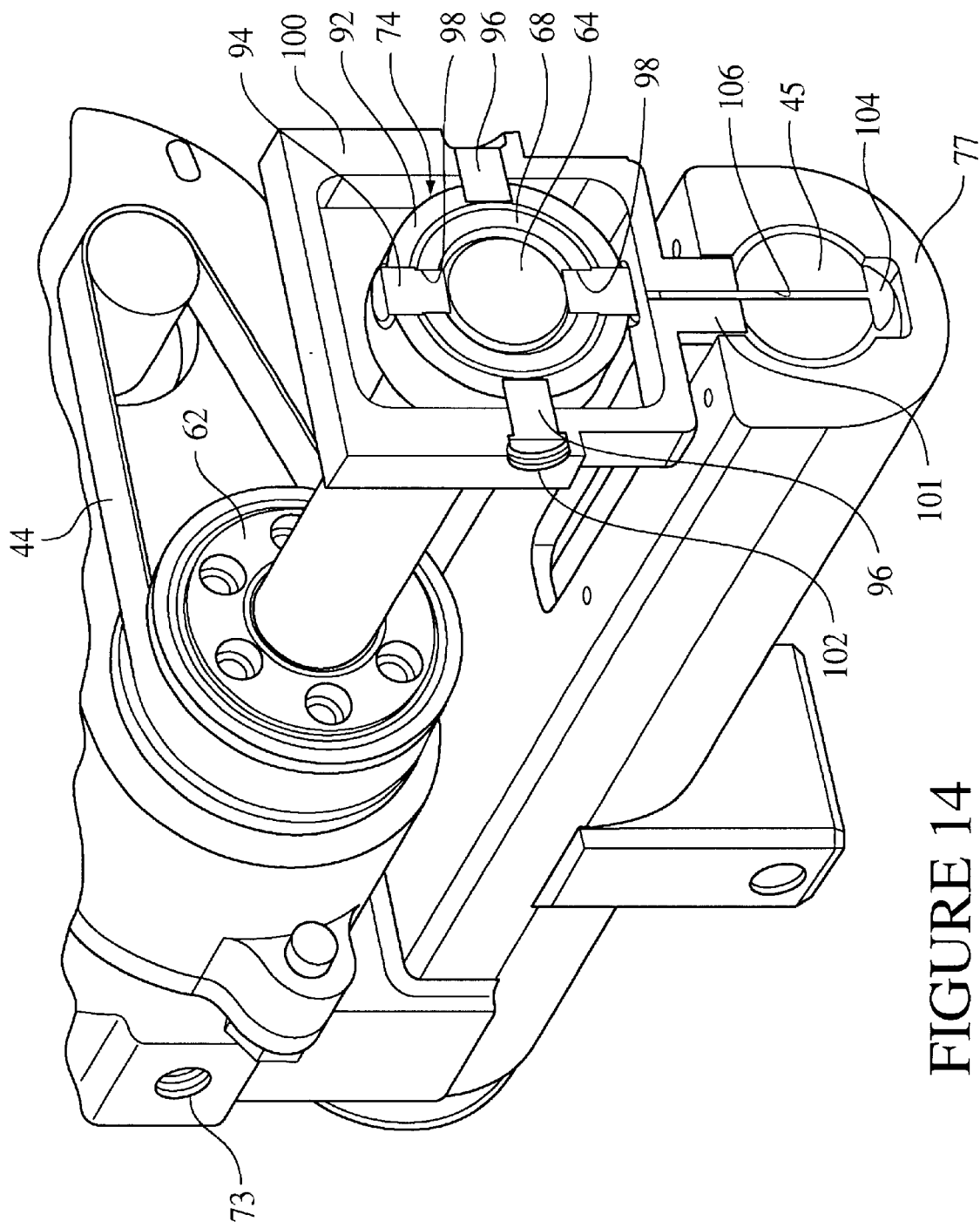
FIG. 14 is a partial cross sectional perspective view of a universal joint of a rack-independent actuator constructed in accordance with an exemplary embodiment of the present invention.

FIGS. 8 and 9 illustrate universal joints 72 and 74 in an exploded view in order to illustrate the component parts of the sane.

Universal joint 72 secures a housing 75 to a mounting member 76 of rack assembly 30. Universal joint 72 contains two sets of hinge pins, or pivots 78 and 80, the axis of each set being perpendicular to the other. Each set of pins is connected to the other by a central gimbal ring 82.

As an alternative, universal joints 72 and 74 may be replaced by a compliant member which allows similar degrees of freedom for the range of motion necessary to isolate the reduction mechanisms from transient and non-axial (to the rack) loads. For example, gimbal ring 82 is replaced by a rubber ring which is inserted into mounting member 76 while also covering a portion of housing 75. The rubber ring is compressible and thus capable of providing kinematic freedom. Similarly, gimbal ring 92 may be replaced by a compliant rubber ring.

In yet another alternative, rack independent actuator may be constructed with a universal joint and a rubber compliant member. For example, universal joints 72 and a rubber compliant member replacing universal joint 74 or vice versa.

In an exemplary embodiment, pins 78 and 80 are pressed at their respective openings in gimbal ring 82. This allows the rotational movement of gimbal ring 82 while also providing a means for securing the same. Alternatively, pins 78 and 80 slip in openings in housing 75 and mounting member 76.

Alternatively, pins 78 and 80 and their respective openings in gimbal ring 82, housing 75 and mounting member 76 are configured to provide a movable means of securing the same.

Pins 78 movably connect gimbal ring 82 to housing 75. In an exemplary embodiment, housing 75 is configured to have an elongated cylindrical shape allowing a portion of housing 75 to be inserted within an inner opening of gimbal ring 82. Thus, pins 78 allow gimbal ring to be movably secured to housing 75.

In addition, pins 80 movably connect gimbal ring 82 to mounting member 76. Mounting member 76 is fixedly secured to an outer housing 77 of rack assembly 30. In an exemplary embodiment, mounting member 76 defines an inner opening 88 sufficiently large enough to pass over gimbal ring 82.

Accordingly, gimbal ring 82 is movably secured to housing 75, and housing 75 is sufficiently long enough to position gimbal ring 82 within opening 88 of securement member 76, thus gimbal ring 82 connects housing 75 and securement member 76 by pins 78 and 80. Pins 78 pass through openings 73 in securement member 76 and movably secured gimbal ring 82 to securement member 76, while pins 80 movably secure gimbal ring 82 to housing 75 by engaging openings 81 in housing 75. In an exemplary embodiment, pins 78 and 80 are positioned at right angles with respect to each other. Of course, the angular positioning of pins 78 and 80 may vary as long as the intended effect of isolating potions of the rack independent actuator from unwanted loads is achieved.

For example, pins 80 prevent a load from being transferred in-between mounting member 76 and gimbal ring 82 in a first direction while pins 78 prevent a load from being transferred in-between housing 75 and gimbal ring 82 in a second direction. The first and second directions being different from each other.

As an alternative, and in order to prevent a load from being transferred to gimbal ring 82 and/or gimbal ring 92 the pins which secure the gimbal rings are covered with plastic and/or rubber to further enhance the isolation of the mechanism from unwanted loads.

Rack-independent actuator 70 has an electric motor assembly 90. Electric motor assembly 90 includes electric motor 38, rotatable shaft 42, and motor pulley 40 that is fixedly secured to motor shaft 42. As pulley 40 is rotated by motor shaft 42, belt 44 engages with pulley 40 as well as pulley 62. Since pulley 62 is fixedly secured to screw 64 of the ball-screw mechanism, the rotational movement of pulley 62 causes screw 64 of the ball-screw mechanism to rotate. Accordingly, motor 38, belt 44, pulleys 40 and 62 provide a rotary to rotary conversion, which is determined by the dimensions of pulley 40 and 62 with respect to each other (e.g. gear ratio).

As an alternative and in accordance with the present invention it is contemplated that other mechanisms and means for rotary to rotary conversion may be employed with the present invention. For example, pulleys 40 and 62 and belt 44 can be replaced by a direct mechanical linkage such as a gear train rotary to rotary drive or equivalent thereof.

One end of screw 64 of the ball-screw mechanism is mounted for rotation within a plurality of bearings 65 located within housing 75 proximate to pulley 62. A pre-load nut adjuster or locking nut 67 screws onto the screw 64 of the ball-screw mechanism adjacent to bearings 65, once in position locking nut is secured to screw 64 of the ball-screw mechanism through the use of a plurality of locking screws 63 which when rotated lock locking nut 67 onto screw 64 of the ball-screw mechanism. Thus, bearings 65 are positioned between locking nut 67 and pulley 62 allowing for the rotational movement of screw 64 of the ball-screw mechanism. The other end of screw 64 of the bale screw mechanism is rotatably supported by ball-screw nut 68 of ball-screw mechanism 66. Accordingly, the rotational movement of screw 64 of the bale screw mechanism by motor 38 is isolated at one end by universal joint 72.

A portion of screw 64 of the ball-screw mechanism passes through ball-screw nut 68, and the respective surfaces of screw 64 of the ball-screw mechanism and ball-screw nut 68 are configured to effect the linear movement of ball-screw nut 68 as screw 64 of the ball-screw mechanism is rotated. In an exemplary embodiment, a plurality of balls 69 are received within a pair of threaded or grooved surfaces 71 positioned on the inner surface of ball-screw nut 68 and the outer surface of screw 64 of the ball-screw mechanism. The interface of screw 64 of the ball-screw mechanism and ball-screw nut 68 of ball-screw mechanism 66 are constructed in a known manner.

Accordingly, and as screw 64 of the ball-screw mechanism is rotated by the rotational movement of pulley 62 by motor 38, the rotational movement of screw 64 of the ball-screw mechanism is converted into linear movement of ball-screw nut 68. It is here that rotary to linear conversion occurs. As an alternative, other means for rotary to linear conversion are contemplated for use with the present invention.

The interface between ball-screw nut 68 and rack 45 is isolated by universal joint 74. Ball-screw nut 68 is secured to a gimbal ring 92 of universal joint 74. Similarly to universal joint 72, universal joint 74 contains two sets of hinge pins or pivots 94 and 96, the axis of each set being perpendicular to the other. Each set of pins is connected to the other by central gimbal ring 92.

In an exemplary embodiment, pins 94 and 96 are pressed in their respective openings in gimbal ring 92. This allows the rotational movement of gimbal ring 92 while also providing a means for securing the same.

Alternatively, pins 94 and 96 and their respective openings in gimbal ring 92, ball-screw nut 68 and housing member 100 are configured to provide a movable means of securing the same.

Pins 94 movably connect gimbal ring 92 to ball-screw nut 68 allowing for movement in a first direction. In an exemplary embodiment, gimbal ring 92 is configured to have a cylindrical shape slightly larger than ball screw nut 68, allowing a portion of ball-screw nut 68 to be inserted within gimbal ring 92. Pins 94 are received within a pair of pin openings 98 in the ball-screw nut 68. It is noted that universal joint 74 and ball-screw nut 68 are shown in FIGS. 8 and 9 in an exploded manner so as to illustrate the attachment of universal joints 72 and 74.

Pins 96 movably connect gimbal ring 92 to a housing member 100 allowing for movement in second direction, the second directional plane being orthogonal to the first directional plane. Pins 96 pass through a pair of apertures 102 in housing 100, thus movably connecting gimbal ring 92 to housing 100.

The gimbal mechanisms or in particular universal joints 72 and 74 provide the necessary kinematic degrees of freedom to prevent non-axial loads and for turning or bending moments on the ball-screw nut or screw, such as those that would result from misalignment of the shafts, from producing undesirable friction and the resultant loss of efficiency on the rotary to linear motion conversion mechanism.

In so doing, the torque output and power consumption requirements of the mechanism used to turn the ball-screw such as the electric motor is reduced. This allows the electric motor to be reduced in size as well as the components of the rotary to linear actuator. This is particularly useful for applications such as vehicular electric steering actuators, where the dynamic loads experienced by the vehicle and the requirements placed on the mechanism can significantly impact the motor and actuator mechanism requirements. The reduction in power consumption of the motor and the weight reductions associated with a smaller electric motor and mechanism represent desirable to design parameters.

Figure 4:
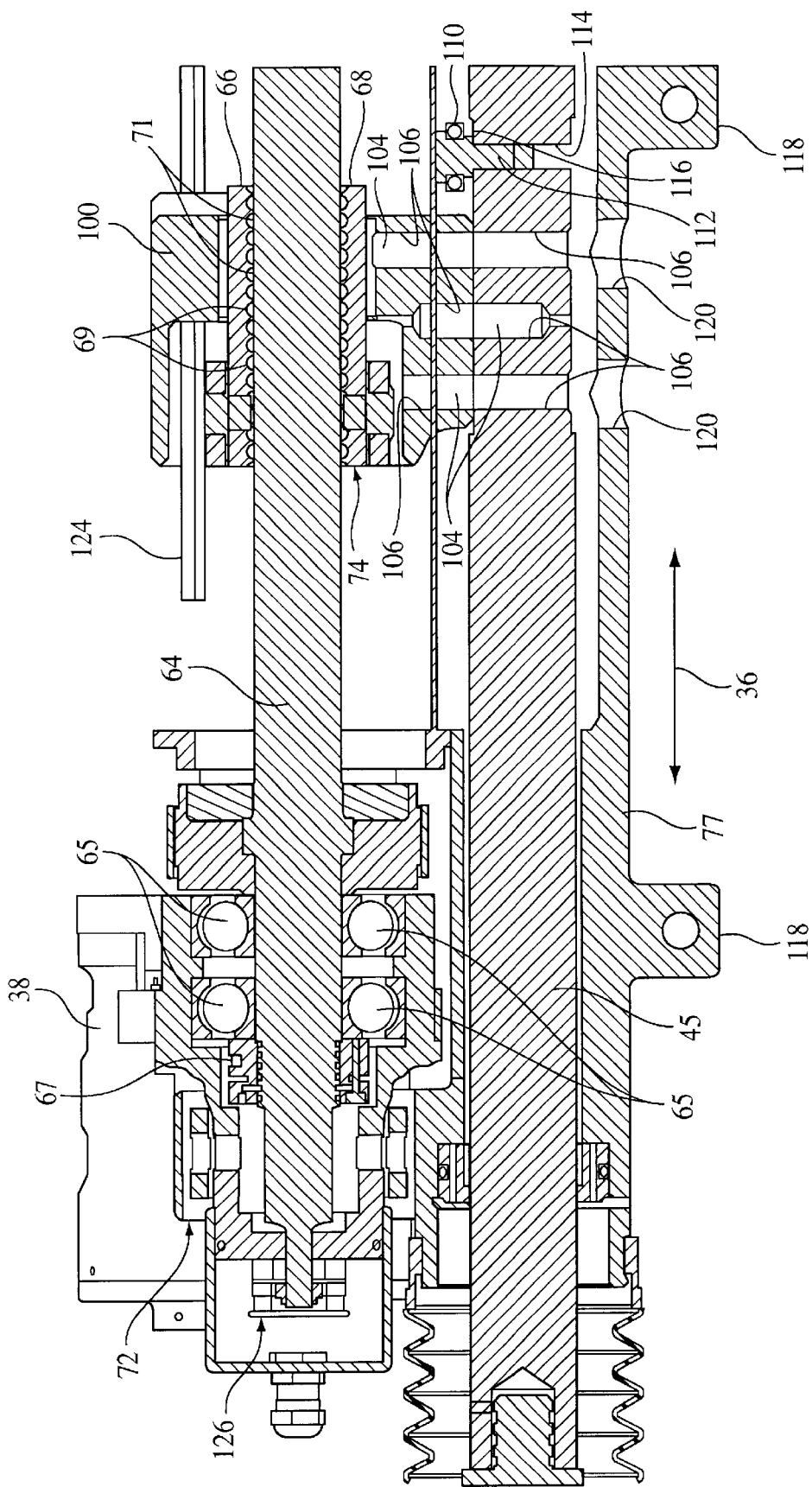
FIG. 4 is a cross-sectional view of a rack-independent actuator constructed in accordance with an exemplary embodiment of the present invention.
Figure 5:
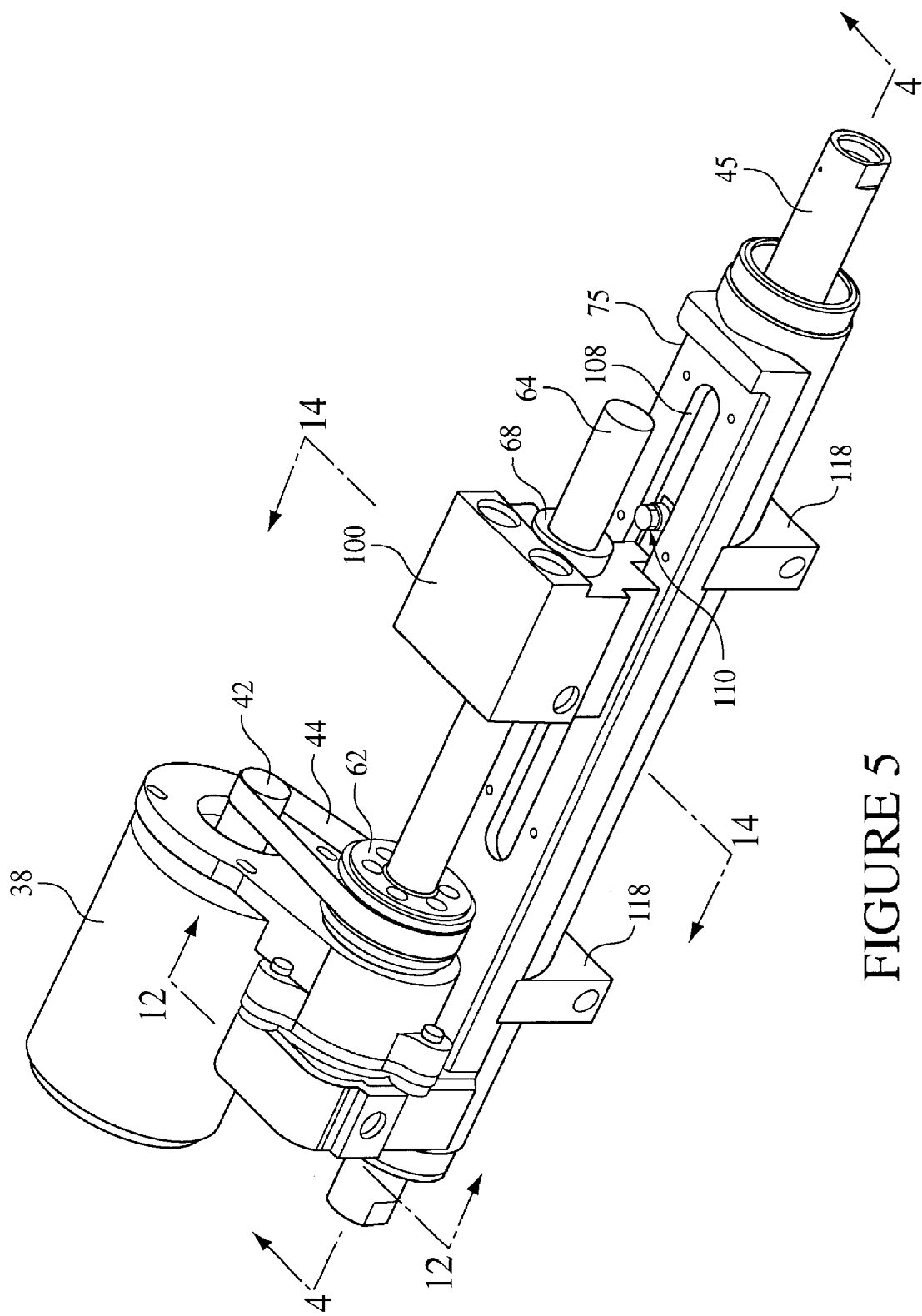
FIG. 5 is another perspective view of a rack-independent actuator.
Figure 6:
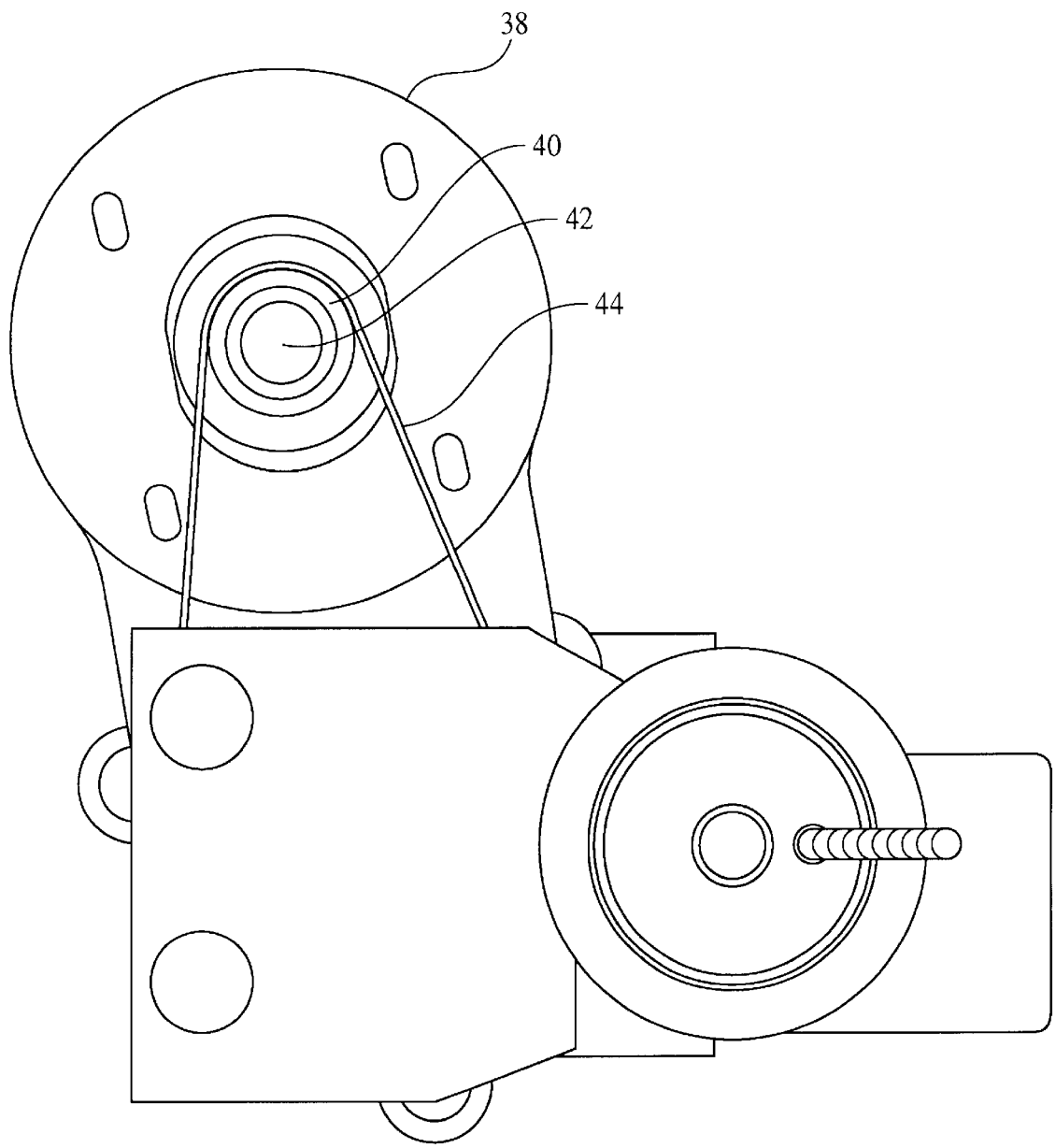
FIG. 6 is an end view of a rack-independent actuator constructed in accordance with an exemplary embodiment of the present invention.
Figure 7:
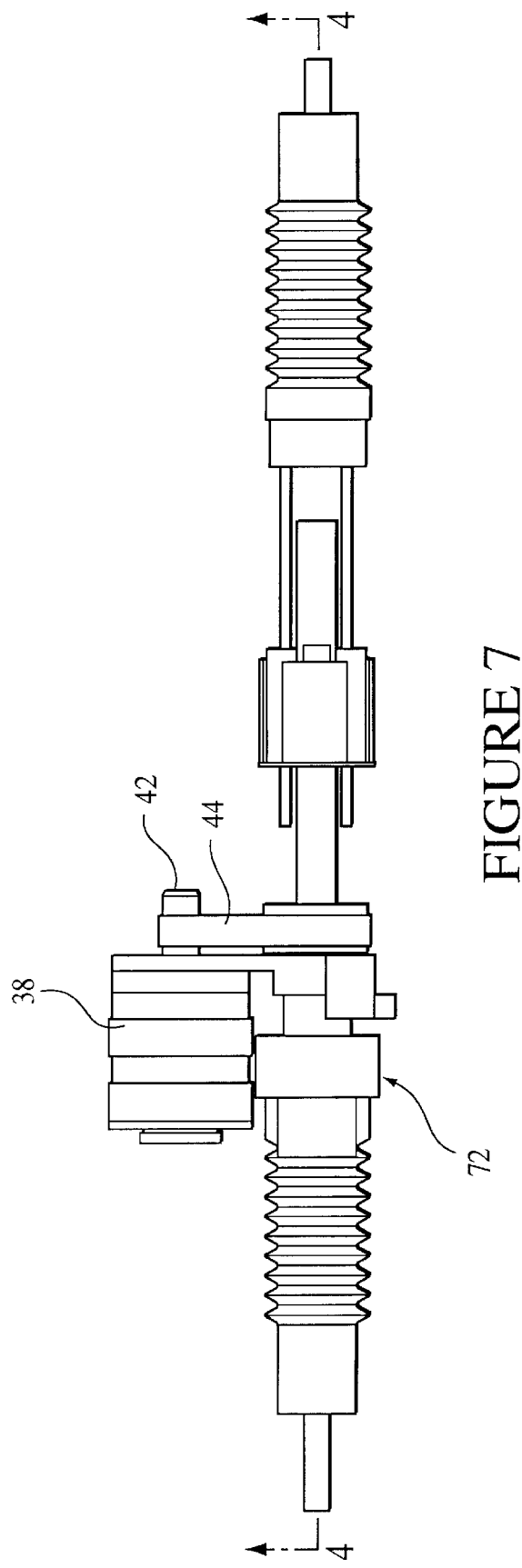
FIG. 7 is a top plan view of a rack-independent actuator constructed in accordance with an exemplary embodiment of the present invention.

Referring now in particular to FIG. 4, housing 100 is fixedly secured to rack 45 through a plurality of bolts 104 which pass through complementary bolt openings 106 in rack 45 and housing 100. Accordingly, and as a rotational force is applied to screw 64 of the ball-screw mechanism, ball-screw assembly 66 converts the rotary movement of screw 64 of the ball-screw mechanism into the linear movement of ball-screw nut 68. Ball-screw nut 68 is connected to rack 45 through a universal joint 74, which is connected to ball-screw nut 68 at one end and housing 100 at the other. Housing 100 is fixedly secured to rack 45 and accordingly, as ball-screw nut 68 moves in the direction indicated by arrows 36, a similar movement of rack 45 is produced.

Housing member 100 is configured to have a mounting portion 101 which is configured to be received within opening 108. Mounting portion 101 is configured to be slidably received within opening 108 and contains the apertures into which bolts 104 are received.

Universal joints 72 and 74 isolate electric motor assembly 90 and ball-screw pulley 62 from transient non-axial loads, which may damage or misalign pulleys 40 and 62. Moreover, universal joints 72 and 74 isolate the system from undesirable loads or stack buildup which may be the result of misalignment of a component part such as rack 45, ball-screw 64 and/or any other component part which may produce an undesirable load or stack buildup.

The rack-independent actuator also allows the two pulleys on the belt and pulley mechanism to be mounted to the same housing and to eliminate all force components that could alter their parallelism.

Moreover, the rack-independent actuator of an exemplary embodiment no longer requires the motor shaft of motor 38 or the screw 64 of the ball-screw mechanism to be parallel to rack 45, as motor assembly 90 and screw 64 of the ball-screw mechanism are isolated from rack 45 through the use of universal joints 72 and 74. Thus, any misalignment of screw 64 of the ball-screw mechanism with regard to rack 45 is accommodated for by universal joints 72 and 74. Accordingly, motor shaft 42 need only be parallel to screw 64 of the ball-screw mechanism, or alternatively, pulleys 40 and 62 need only be parallel to each other. Accordingly, and since they are mounted to the same housing, this is easily achieved and maintained. Moreover, any loads which may cause misalignment are isolated from the motor assembly through the use of universal joints 72 and 74.

Also, pulleys 40 and 62 may be configured with or without retaining walls because, as stated above, belt 44 is isolated from transient forces, thus reducing belt/pulley production costs, since the belt and pulley system does not have to be designed to withstand large forces.

Referring back now to FIGS. 4, 8, 9 and 11–14, outer housing 77 of rack assembly 30 is configured to have an elongated opening 108. In order to prevent the rotational motion of the rack 45, an anti-rotation device 110 is secured to rack 45 (FIG. 4) that moves within the confinement of the elongated opening 108.

In an exemplary embodiment, anti-rotation device 110 is a plug 112 fixedly secured within an opening 114 of rack 45. Plug 112 has an upper member depending outwardly from rack 45, and is sized and configured to pass along in elongated opening 108. In addition, and in order to reduce any frictional buildup between plug 112 and the elongated opening 108, a plurality of bearings 116 are positioned around the periphery of anti-rotation device 110. Accordingly, anti-rotation device 110 prevents rotational movement of rack 45 while allowing linear movement of the same.

Rack assembly 30 is also configured to have a pair of mounting members 118. Mounting members 118 are configured to secure rack-independent actuator 70 to a vehicle frame (not shown).

In addition, and referring now to FIG. 4, housing 77 of rack assembly 30 has a pair of apertures 120. Apertures 120 are positioned to allow a tool such as a screwdriver or other type of tool to be inserted into openings 120 in order to facilitate the securement of bolts 104 to housing 100 and rack 45.

The steering system is equipped with several sensors that relay information to the electric motor 38 by way of a controller 52 (FIG. 1). Controller 52 will track the position and force upon rack 45 at all times by means of a pair of force sensors 122. Force sensors 122 provide input into controller 52 corresponding to the amount of force included at the ends of rack 45.

A pair of absolute position sensors 124 and a high-resolution sensor 126 also provide input into controller 52 in the form of a rack position location. For example, an on-center position sensor may comprise Hall-Effect devices, which are mounted within rack-independent actuator 70. It may be understood that the sensors and controller 52 comprise a calibration means for maintaining the values of the steering position signals that correspond with the actual steering positions.

Rack 45 has a center position in which the steerable wheels of a vehicle are directed straight ahead relative to the vehicle. In an exemplary embodiment, rack-independent actuator 70 will provide a return torque that assists in returning the steering system to a center position.

In this system, the return torque is generated by electric motor 38, and a return torque component of the total desired torque signal is generated in controller 52 based upon the input received from sensors 122, 124, and 126. Thus, an accurate signal of the steering position is derived from absolute position sensor 124.

In order to express the full range of steering angles as the output of absolute position sensor changes, the apparatus utilizes an algorithm in controller 52. The algorithm may be embodied in a programmed digital computer or a custom digital processor (not shown).

Figure 15:
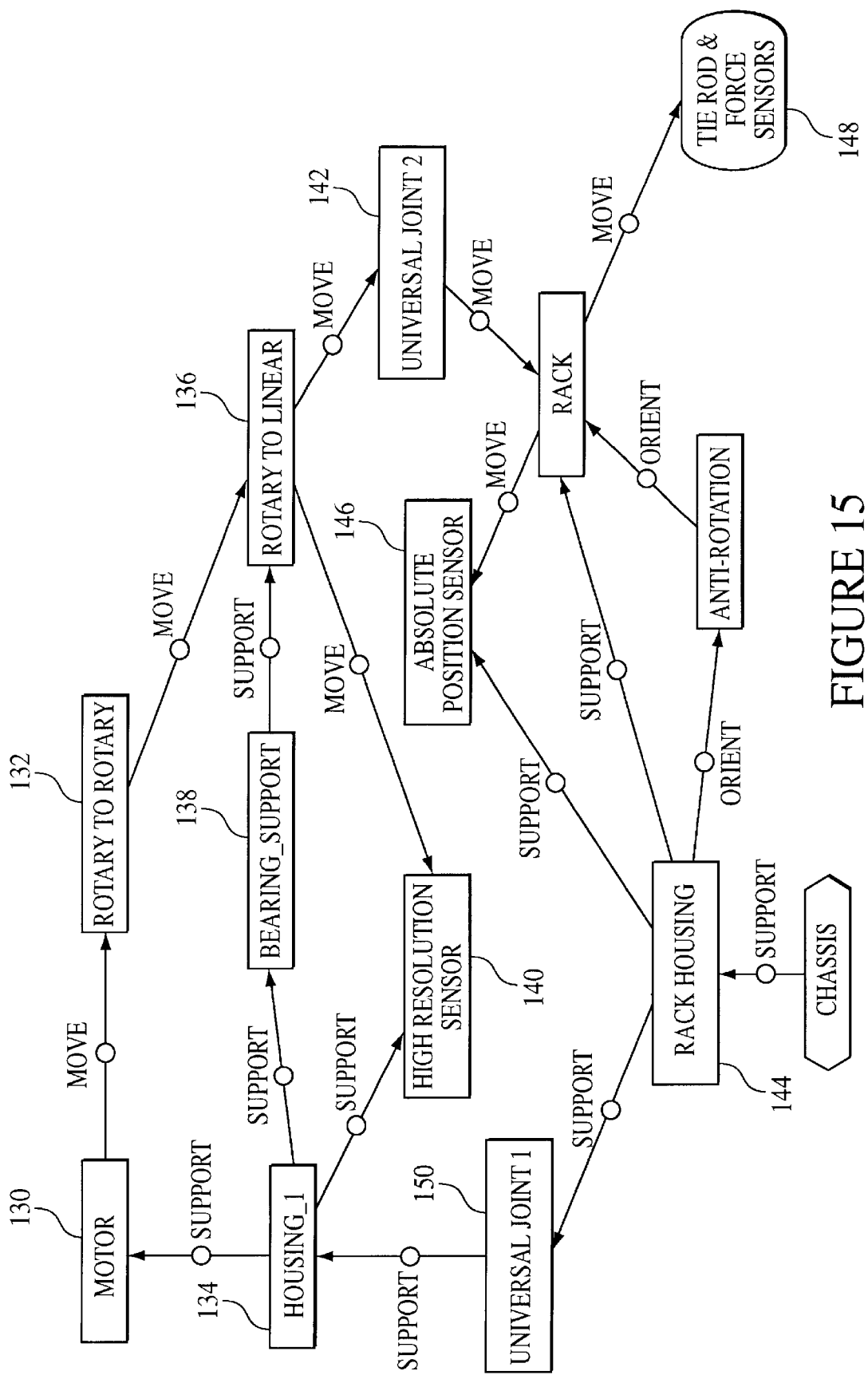
FIG. 15 is a block diagram of a rack-independent actuator system.

Referring now to FIG. 15, a block diagram illustrates the use of the universal joints and the unit interaction between various components of the rack-independent actuator system.

Block 130 represents the electric motor. Block 130 interfaces with block 132 that represents the rotary-to-rotary assembly of the rack-independent actuator system. Block 130 also interfaces with the housing of the ball-screw indicated at block 134. Block 132 interfaces with a block 136 that represents a rotary-to-linear assembly. Block 136 interfaces with a block 138 that represents the bearings of the ball-screw, and block 138 interfaces with the ball-screw housing. Block 140 represents a high-resolution sensor that interfaces with the housing (block 134) and the rotary to linear assembly (block 136).

Block 142 represents an interface between the rotary-to-linear assembly and the housing of the rack assembly.

Block 144 represents the housing of the rack assembly. Block 146 represents an absolute position sensor which interfaces with box 136 and box 144. Block 148 represents a tie rod and force sensor which interfaces with the housing of the rack assembly (block 144).

Block 150 represents the interface between housing 134 and the rack housing 144. It is here at block 150 in which universal joint 72 or stationary universal joint 72 is inserted to isolate the motor and belt and pulley assembly from the housing of the rack assembly.

Block 142 represents the interface between the rotary-to-linear assembly housing and the rack assembly. It is here at block 142 in which universal joint 74 or mobile universal joint 74 is inserted to isolate the movement of the rack assembly from the ball-screw nut of the ball-screw assembly.

This system accomplishes compensation through a series of sensors that provide feedback to several components. For instance, the rotary to-linear assembly at block 136 receives inputs from the absolute position sensors at block 146. In this embodiment, the absolute position sensors are mounted to the ball-screw assembly. The absolute position sensor at block 146 provides steer angle signals that are sent to the controller.

While an exemplary embodiment of the present invention has been described with reference to a steering system for a vehicle, the rotary-to-linear mechanism is not intended to be limited to such applications. It is contemplated that in accordance with the present invention, a rotary-to-linear conversion mechanism utilizing a pair of universal joints for isolating the mechanism from misalignment and/or uneven loading can be applied to any application.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A steering system for a vehicle, comprising:
   a) a rack being movably mounted within a rack housing, said rack being coupled to a steerable road wheel at one end and another steerable road wheel at the other end;
   b) a ball-screw mechanism being coupled to said rack at one end and an electric motor at the other, said electric motor providing an actuating force to said ball-screw mechanism, said actuating force causing said rack to move linearly within said rack housing;
   c) a first coupling mechanism coupling said electric motor to said rack housing; and
   d) a second coupling mechanism coupling said ball-screw mechanism to said rack.

2. The steering system as in claim 1, wherein said first coupling mechanism and said second coupling mechanism are universal joints.

3. The steering system as in claim 2, wherein said actuating force is the rotation of a first pulley fixedly secured to a rotatable shaft of said motor, said first pulley being coupled to a second pulley, said second pulley being fixedly secured to a ball-screw screw of said ball-screw mechanism.

4. The steering system as in claim 3, wherein said first pulley is coupled to said second pulley by a belt.

5. The steering system as in claim 3, wherein the rotation of said ball-screw causes linear movement of a ball-screw nut of said ball-screw mechanism.

6. The steering mechanism as in claim 2, wherein said first and second universal joints each have a gimbal ring with a first pair and a second pair of pins for movably securing said gimbal ring, said first pair of pins being orthogonal with respect to said second pair of pins.

7. The steering mechanism as in claim 3, wherein said first universal joint movably secures said motor and its housing to said rack housing.

8. The steering mechanism as in claim 7, wherein said second universal joint movably secures said ball-screw nut to said rack.

9. The steering mechanism as in claim 5, wherein said ball-screw mechanism further includes a housing, said housing being secured movably secured to said second universal joint.

10. The steering system as in claim 1, further comprising a plurality of sensors for providing signals to a controller, said controller controlling the activation and deactivation of said electric motor.

11. The steering system as in claim 10, wherein said plurality of sensors includes position sensors, force sensors, steering sensors, and a high-resolution sensor.

12. The steering system as in claim 11, wherein said force sensors detect forces acting on the ends of said rack.

13. The steering system as in claim 11, wherein said position sensors detect movements of said rack.

14. The steering system as in claim 11, wherein said steering sensor detects forces applied to a steering wheel.

15. The steering system as in claim 1, wherein said rack includes an anti-rotation mechanism, said anti-rotation mechanism preventing the rotation of said rack.

16. The steering system as in claim 15, wherein said anti-rotation feature includes a plurality of bearings and a protruding member being fixedly secured to said rack, said plurality of bearings movably engaging an elongated opening of said rack housing.

17. The steering system as in claim 6, wherein said pins are coated with a rubber material.

18. The steering system as in claim 17, wherein said pins are press fitted in said gimbal rings.

19. The steering system as in claim 1, wherein said steering system is a steer-by-wire system.

20. The steering system as in claim 19, wherein said steer-by-wire system responds to a plurality of inputs from a controller.

21. The steering system as in claim 20, wherein said plurality of inputs indicate movement of a steering mechanism being manipulated by a user.

22. The steering system as in claim 1, wherein said rack is movably mounted a first road wheel and said steering system further comprises:
- a second rack being movably mounted within a second rack housing, said second rack being coupled to a second steerable road wheel;
- a second ball-screw mechanism being coupled to said second rack at one end and a second electric motor at the other, said second electric motor providing an actuating force to said second ball-screw mechanism, said actuating force causing said second rack to move linearly within said second rack housing;
- a first coupling mechanism coupling said second electric motor to said second rack housing; and
- a second coupling mechanism coupling said second ball nut to said second rack, wherein said rack and said second rack independently actuate said first road wheel and said second road wheel.

23. The steering system as in claim 1, wherein said electric motor provides a return torque for returning said rack to a center position corresponding to a center position of said road wheels.

24. A steering system for a vehicle, comprising:
- a rack being movably mounted within a rack housing, said rack having a first end and a second end, said first end being configured to be coupled to a first steerable road wheel and said second end being configured to be coupled to a second steerable road wheel;
- a ball-screw mechanism coupling a portion of said rack to an electric motor such that said electric motor provides an actuating force to said ball-screw mechanism, said actuating force causing said rack to move linearly along a first axis within said rack housing;
- a means for coupling said electric motor to said rack housing, wherein said electric motor is isolated from forces which may affect said actuating force; and
- a means for coupling said ball-screw mechanism to said rack, wherein said said ball-screw mechanism is isolated from said is isolated from forces which may affect said actuating force.

25. The steering system as in claim 24, wherein said coupling means are selected from the group consisting of universal joints, gimbals, and compliant members.

26. The steering system as in claim 25, wherein said coupling means isolate transient forces and forces that are not axial aligned to said first axis.

* * * * *